(12) United States Patent
Cheng

(10) Patent No.: US 11,318,705 B2
(45) Date of Patent: May 3, 2022

(54) PLY STACKINGS FOR SOLID LAMINATE STIFFENED PANEL

(71) Applicant: The Boeing Company, Chicago, IL (US)

(72) Inventor: Jiangtian Cheng, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/551,165

(22) Filed: Aug. 26, 2019

(65) Prior Publication Data

US 2021/0060894 A1  Mar. 4, 2021

(51) Int. Cl.
*B32B 5/12* (2006.01)
*B32B 5/26* (2006.01)
*B64C 1/00* (2006.01)

(52) U.S. Cl.
CPC .................. *B32B 5/12* (2013.01); *B32B 5/26* (2013.01); *B64C 1/00* (2013.01); *B32B 2250/05* (2013.01); *B32B 2250/20* (2013.01); *B32B 2262/106* (2013.01); *B32B 2307/546* (2013.01); *B32B 2605/18* (2013.01); *B64C 2001/0072* (2013.01)

(58) Field of Classification Search
CPC ......... B32B 5/12; B32B 5/26; B32B 2605/18; B32B 2307/546; B32B 2262/106; B32B 2250/05; B32B 2250/20; B64C 1/00; B64C 2001/0072
See application file for complete search history.

(56) References Cited

U.S. PATENT DOCUMENTS

| | | | |
|---|---|---|---|
| 2010/0219294 A1* | 9/2010 | Kismarton | B29C 65/08 244/119 |
| 2011/0045232 A1 | 2/2011 | Kismarton | |
| 2016/0046361 A1* | 2/2016 | Dan-Jumbo | B64C 3/182 244/87 |
| 2016/0144943 A1 | 5/2016 | Cheng et al. | |

(Continued)

FOREIGN PATENT DOCUMENTS

EP  3173224 A1  5/2017

OTHER PUBLICATIONS

Cheng, "Solid Laminate Stringer," U.S. Appl. No. 15/907,224, filed Feb. 27, 2018.

(Continued)

*Primary Examiner* — Brian Handville
(74) *Attorney, Agent, or Firm* — MH2 Technology Law Group LLP

(57) ABSTRACT

A composite panel includes a plurality of segments, wherein each segment includes a plurality of reinforcement plies such as carbon fiber plies. Collimated fiber bands (e.g., carbon fibers) within each reinforcement ply are oriented in a single direction, which can be, for example, 0°, 45°, 90°, and −45°. Each segment can include a stack of reinforcement plies, wherein the collimated fiber bands of each reinforcement ply are oriented in one of these directions. The orientations of the collimated fiber bands that form the reinforcement plies in a stack determine a stiffness of the stack and the segment that includes the stack. The stiffness of each segment is controlled to reduce a stiffness mismatch between adjacent segments that form the composite panel, thereby reducing separation of the segments during use.

20 Claims, 6 Drawing Sheets

| PLY # | ANGLE |
|---|---|
| 1 | 45 |
| 2 | 90 |
| 3 | −45 |
| 4 | 0 |
| 5 | 0 |
| 6 | 45 |
| 7 | 0 |
| 8 | 0 |
| 9 | −45 |
| 10 | 0 |
| 11 | 0 |
| 12 | −45 |
| 13 | 90 |
| 14 | 45 |

600, 650

(56) References Cited

U.S. PATENT DOCUMENTS

| | | | |
|---|---|---|---|
| 2017/0151709 A1* | 6/2017 | Kwon | B29D 99/0014 |
| 2019/0047248 A1* | 2/2019 | Throckmorton | C08J 5/042 |
| 2019/0047676 A1 | 2/2019 | Behzadpour et al. | |
| 2019/0047677 A1 | 2/2019 | Cheng et al. | |

OTHER PUBLICATIONS

Extended European Search Report dated Jan. 25, 2021 in corresponding European Application No. 20191697.0, 8 pages.

* cited by examiner

| PLY # | ANGLE | PLY # | ANGLE |
|---|---|---|---|
| 1 | 0 | 17 | 0 |
| 2 | 0 | 18 | -45 |
| 3 | 45 | 19 | 0 |
| 4 | 90 | 20 | 45 |
| 5 | -45 | 21 | 90 |
| 6 | 0 | 22 | -45 |
| 7 | 0 | 23 | 0 |
| 8 | 45 | 24 | 0 |
| 9 | 0 | 25 | 45 |
| 10 | 0 | 26 | 0 |
| 11 | -45 | 27 | 0 |
| 12 | 90 | 28 | -45 |
| 13 | 45 | 29 | 90 |
| 14 | 0 | 30 | 45 |
| 15 | -45 | 31 | 0 |
| 16 | 0 | 32 | 0 |

FIG. 5

| PLY # | ANGLE | PLY # | ANGLE |
|---|---|---|---|
| 1 | 45 | 21 | 0 |
| 2 | 90 | 22 | -45 |
| 3 | -45 | 23 | 90 |
| 4 | 0 | 24 | 45 |
| 5 | 45 | 25 | 0 |
| 6 | 0 | 26 | -45 |
| 7 | -45 | 27 | 0 |
| 8 | 0 | 28 | 45 |
| 9 | 45 | 29 | 90 |
| 10 | 0 | 30 | -45 |
| 11 | -45 | 31 | 0 |
| 12 | 90 | 32 | 45 |
| 13 | 45 | 33 | 0 |
| 14 | 0 | 34 | -45 |
| 15 | -45 | 35 | 0 |
| 16 | 0 | 36 | 45 |
| 17 | 45 | 37 | 0 |
| 18 | 90 | 38 | -45 |
| 19 | -45 | 39 | 90 |
| 20 | 0 | 40 | 45 |

FIG. 4

| PLY # | ANGLE |
|---|---|
| 1 | 45 |
| 2 | 90 |
| 3 | -45 |
| 4 | 0 |
| 5 | 0 |
| 6 | 45 |
| 7 | 0 |
| 8 | 0 |
| 9 | -45 |
| 10 | 0 |
| 11 | 0 |
| 12 | -45 |
| 13 | 90 |
| 14 | 45 |

FIG. 6

| PLY # | ANGLE |
|---|---|
| N-13 | 45 |
| N-12 | 90 |
| N-11 | -45 |
| N-10 | 0 |
| N-9 | 0 |
| N-8 | -45 |
| N-7 | 0 |
| N-6 | 0 |
| N-5 | 45 |
| N-4 | 0 |
| N-3 | 0 |
| N-2 | -45 |
| N-1 | 90 |
| N | 45 |

FIG. 7

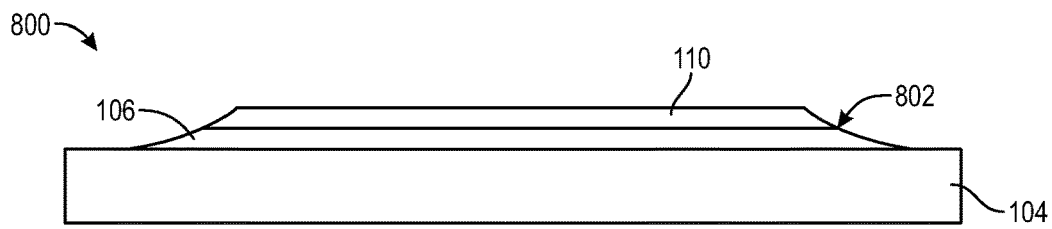
FIG. 8
| PART | | AXIAL FIBER % | TRANSVERSE FIBER % | AXIAL MODULUS EX (MSI) | POISSON RATIO | POISSON RATIO MISMATCH (≤0.06) |
|---|---|---|---|---|---|---|
| SKIN SEGMENT | | 35 | 15 | 9.4 | 0.41 | REFERENCE |
| STRINGER SEGMENT | BASE | 43 | 14 | 10.7 | 0.37 | 0.04 |
| | TOP | 43 | 14 | 10.7 | 0.37 | 0.04 |
| | MIDDLE | 50 | 12 | 12.0 | 0.39 | 0.02 |
FIG. 9
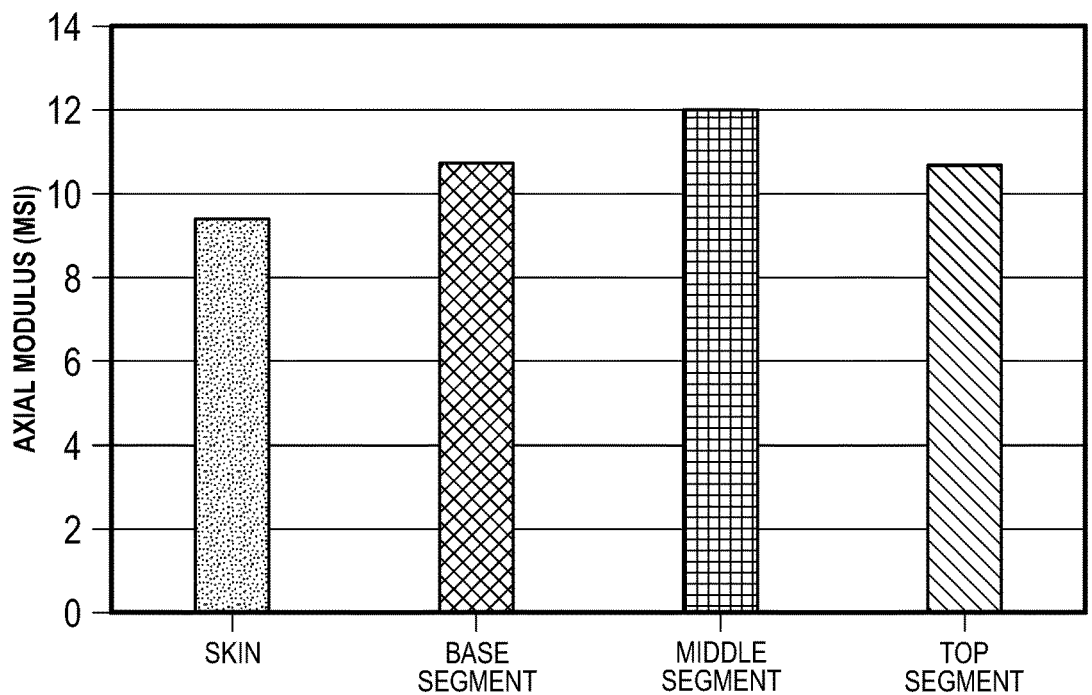
FIG. 10

PLY STACKINGS FOR SOLID LAMINATE STIFFENED PANEL

TECHNICAL FIELD

The present teachings generally relate to structural components such as composite panels used to manufacture aircraft or other articles of manufacture and, more particularly, to composite structural component assemblies and methods for forming same.

BACKGROUND

A fuselage, wing, tail, empennage, etc. of an aircraft can be manufactured using composite panels such as solid laminate stringers that connect to a supporting framework. The composite panels can include an outer skin and an interior laminate, where the interior laminate forms, at least in part, a stringer. The skin and interior laminate can each be formed from a plurality of carbon fiber layers or plies bonded with a thermoplastic resin adhesive or matrix, referred to as a prepreg. The skin of the composite panel is exposed and provides an external surface of the aircraft during use. The composite panel must be resilient to damage from stresses and strains resulting from, for example, aerodynamic loads and temperature changes placed on the composite panel during use. These stresses and strains can cause the composite panels to flex, bend, twist, expand, contract, etc., during use and, over time, can result in delamination or other damage to the carbon fiber plies.

Composite panels that are more resistant to damage from stresses and strains placed upon the composite panels during use would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation, a composite panel includes a composite panel segment can include a plurality of carbon fiber plies arranged along a length and a width of the segment, wherein the length of the composite panel segment has a longitudinal axis. The plurality of carbon fiber plies are layered into a carbon fiber stack that provides at least a portion of a thickness of the composite panel segment, and includes at least 8 carbon fiber plies. Each carbon fiber ply of the carbon fiber stack has a stiffness, wherein the stiffness of each carbon fiber ply is determined by an orientation of carbon fibers within each carbon fiber ply relative to the longitudinal axis. The plurality of carbon fiber plies of the carbon fiber stack has a plurality of different orientations relative to the longitudinal axis, and thus the plurality of carbon fiber plies of the carbon fiber stack can include a plurality of different stiffnesses. The different orientations of the plurality of carbon fiber plies of the carbon fiber stack are self-symmetric or mostly self-symmetric through the thickness of the composite panel segment about a midpoint of the carbon fiber stack, where the midpoint is parallel to the longitudinal axis wherein, when mostly self-symmetric, the different orientations vary from being self-symmetric in no more than two carbon fiber plies.

Optionally, the longitudinal axis of the of the composite panel segment can be oriented at 0°, and the different orientations of the plurality of carbon fiber plies include 0°, 45°, 90°, and −45° relative to the longitudinal axis of the composite panel segment. The different orientations of the plurality of carbon fiber plies of the carbon fiber stack can be self-symmetric through the thickness of the composite panel segment. Further, the composite panel segment can be a middle segment positioned between a base segment and a top segment, and from 46% to 58% of the plurality of carbon fiber plies can be oriented at 0°. The middle segment can have an axial modulus of elasticity from about 11.4 megapounds per square inch (msi) to about 13.4 msi. Additionally, the middle segment can have a Poisson's ratio from about 0.38 to about 0.50.

In an implementation, the plurality of carbon fiber plies of the carbon fiber stack can include a plurality of repeatably grouped carbon fiber plies, wherein each repeatable group of carbon fiber plies is repeated 2, 4, or 6 times. The different orientations of the plurality of carbon fiber plies of the carbon fiber stack can be mostly self-symmetric through the thickness of the composite panel segment. The carbon fiber stack can include at least 16 carbon fiber plies.

In an implementation, the composite panel segment can be a middle segment, the carbon fiber stack can be a middle segment carbon fiber stack, and the composite panel can further include a base segment and a top segment, wherein the middle segment is positioned between the base segment and the top segment. In this implementation, the base segment can include a plurality of carbon fiber plies arranged along a length and a width of the base segment and the length of the base segment is parallel to the longitudinal axis, the plurality of carbon fiber plies of the base segment are layered into a base segment carbon fiber stack that provides at least a portion of a thickness of the base segment, and the base segment carbon fiber stack can include at least 10 carbon fiber plies. Further, the plurality of carbon fiber plies of the base segment carbon fiber stack can have a plurality of different orientations relative to the longitudinal axis, and thus the plurality of carbon fiber plies of the base segment carbon fiber stack can include a plurality of different stiffnesses, and the different orientations of the plurality of carbon fiber plies of the base segment carbon fiber stack are self-symmetric or are mostly self-symmetric through the thickness of the base segment about a midpoint of the base segment carbon fiber stack, where the midpoint of the base segment is parallel to the longitudinal axis wherein, when mostly self-symmetric, the different orientations of the plurality of carbon fiber plies of the base segment carbon fiber stack vary from being self-symmetric in no more than two carbon fiber plies. Optionally, the longitudinal axis of the of the composite panel segment is oriented at 0°, and the different orientations of the plurality of carbon fiber plies of the middle segment carbon fiber stack and the plurality of carbon fiber plies of the base segment carbon fiber stack include 0°, 45°, 90°, and −45° relative to the longitudinal axis of the composite panel segment. The middle segment can have an axial modulus of elasticity from about 11.4 megapounds per square inch (msi) to about 13.4 msi, and the base segment and the top segment can each have an axial modulus of elasticity from about 10.0 msi to about 11.4 msi.

In an implementation, the middle segment can have a Poisson's ratio from about 0.38 to about 0.50, and the base segment and the top segment can each have a Poisson's ratio from about 0.36 to about 0.50. The top segment can include a plurality of carbon fiber plies arranged along a length and a width of the top segment and the length of the top segment can be parallel to the longitudinal axis. The plurality of carbon fiber plies of the top segment can be layered into a top segment carbon fiber stack that provides at least a portion of a thickness of the top segment. Further, the top segment carbon fiber stack can include at least 10 carbon fiber plies, the plurality of carbon fiber plies of the top segment carbon fiber stack can include a plurality of different orientations relative to the longitudinal axis, and thus the plurality of carbon fiber plies of the top segment carbon fiber stack can include a plurality of different stiffnesses. The different orientations of the plurality of carbon fiber plies of the top segment carbon fiber stack can be self-symmetric or mostly self-symmetric through the thickness of the top segment about a midpoint of the top segment carbon fiber stack, where the midpoint of the top segment carbon fiber stack can be parallel to the longitudinal axis. When mostly self-symmetric, the different orientations of the plurality of carbon fiber plies of the top segment carbon fiber stack can vary from being self-symmetric in no more than two carbon fiber plies, and the plurality of carbon fiber plies of the top segment carbon fiber stack can be mirror symmetrical to the plurality of carbon fiber plies of the base segment carbon fiber stack.

In an optional implementation, the top segment carbon fiber stack, the middle segment carbon fiber stack, and the base segment carbon fiber stack can be mostly self-symmetric about the midpoint of the middle segment carbon fiber stack. Further, the top segment carbon fiber stack, the middle segment carbon fiber stack, and the base segment carbon fiber stack can form at least a portion of a stringer of the composite panel. The composite panel can further include a skin segment, wherein the top segment, the middle segment, and the base segment can be positioned on a side of the skin segment and the base segment can be positioned between the middle segment and the skin segment. Additionally, the skin segment can include a plurality of carbon fiber plies arranged along a length and a width of the skin segment and the length and of the skin segment can be parallel to the longitudinal axis. The plurality of carbon fiber plies of the skin segment can be layered into a skin segment carbon fiber stack that provides at least a portion of a thickness of the skin segment. Also, the skin segment carbon fiber stack can include at least 8 carbon fiber plies, the plurality of carbon fiber plies of the skin segment carbon fiber stack can include a plurality of different orientations relative to the longitudinal axis, and thus the plurality of carbon fiber plies of the skin segment carbon fiber stack can include a plurality of different stiffnesses. The different orientations of the plurality of carbon fiber plies of the skin segment carbon fiber stack can be self-symmetric through the thickness of the skin segment about a midpoint of the skin segment carbon fiber stack, where the midpoint of the skin segment carbon fiber stack is parallel to the longitudinal axis.

In an implementation, the longitudinal axis of the of the composite panel segment is oriented at 0°, the different orientations of the plurality of carbon fiber plies of the middle segment carbon fiber stack, the plurality of carbon fiber plies of the base segment carbon fiber stack, and the plurality of carbon fiber plies of the skin segment carbon fiber stack can include 0°, 45°, 90°, and −45° relative to the longitudinal axis of the composite panel segment, and from about 46% to about 58% of the plurality of carbon fiber plies of the middle segment carbon fiber stack can be oriented at 0°. Optionally, from about 40% to about 46% of the plurality of carbon fiber plies of each of the top segment carbon fiber stack and the base segment carbon fiber stack can be oriented at 0°. Further optionally, the middle segment can have an axial modulus of elasticity from about 11.4 megapounds per square inch (msi) to about 13.4 msi, the base segment and the top segment can each have an axial modulus of elasticity from about 10.0 msi to about 11.4 msi, and the skin segment can have an axial modulus of elasticity from about 7.7 msi to about 10.0 msi.

Optionally, the middle segment can have a Poisson's ratio from about 0.38 to about 0.50, the base segment and the top segment can each have a Poisson's ratio from about 0.36 to about 0.50, and the skin segment can have a Poisson's ratio from about 0.32 to about 0.48. The top segment, the middle segment, and the base segment can form at least a portion of a solid laminate, and a mismatch of a Poisson's ratio between the solid laminate and the skin segment can be in the range of from about −0.06 to about 0.06.

In another implementation, a composite panel includes a composite panel segment having a plurality of reinforcement plies arranged along a length and a width of the segment, wherein the length of the composite panel segment includes a longitudinal axis. The plurality of reinforcement plies are layered into a reinforcement ply stack that provides at least a portion of a thickness of the composite panel segment. The plurality of reinforcement plies of the reinforcement ply stack includes a plurality of different orientations relative to the longitudinal axis, and the different orientations of the plurality of reinforcement plies of the reinforcement ply stack are self symmetric or mostly self symmetric through the thickness of the composite panel segment about a midpoint of the reinforcement ply stack, where the midpoint is parallel to the longitudinal axis wherein, when mostly self symmetric, the different orientations vary from being self symmetric in no more than two carbon fiber plies. Optionally, the plurality of reinforcement plies includes at least 16 reinforcement plies and the different orientations of the plurality of reinforcement plies are self-symmetric.

In another implementation, a method for forming a composite panel includes layering a plurality of carbon fiber plies together to form a carbon fiber stack of a composite panel segment, wherein the carbon fiber stack includes at least 10 carbon fiber plies, and adhering the plurality of carbon fiber plies together. In this implementation, the plurality of carbon fiber plies are arranged along a length and a width of the composite panel segment, the plurality of carbon fiber plies form at least a portion of a thickness of the composite panel segment, and the length of the composite panel segment includes a longitudinal axis. Further, each carbon fiber ply of the carbon panel stack has a stiffness, the stiffness of each carbon fiber ply is determined by an orientation of carbon fibers within each carbon fiber ply relative to the longitudinal axis, and the plurality of carbon fiber plies of the carbon fiber stack have a plurality of different orientations relative to the longitudinal axis, and thus the plurality of carbon fiber plies of the carbon fiber stack includes a plurality of different stiffnesses. Additionally, the different orientations of the plurality of carbon fiber plies of the carbon fiber stack are self symmetric or mostly self symmetric through the thickness of the composite panel segment about a midpoint of the carbon fiber stack and the midpoint is parallel to the longitudinal axis. When mostly self symmetric, the different orientations vary from being self symmetric in no more than two carbon fiber plies. The method can optionally include orienting the longitudinal axis of the composite panel segment at 0°, orienting each carbon fiber ply of the plurality of carbon fiber plies to have an orientation at one of 0°, 45°, 90°, and 45° relative to the longitudinal axis, and layering the at least 10 carbon fiber plies such that the different orientations of the plurality of carbon fiber plies of the carbon fiber stack are self symmetric.

BRIEF DESCRIPTION OF THE DRAWINGS

The accompanying drawings, which are incorporated in and constitute a part of this specification, illustrate implementations of the present teachings and, together with the description, serve to explain the principles of the disclosure. In the figures:

FIG. 4 is a table listing reinforcement plies and their fiber orientations in a reinforcement ply stack of a skin segment of a composite panel in accordance with an example implementation of the present teachings.

FIG. 5 is a table listing reinforcement plies and their fiber orientations in a reinforcement ply stack of a middle segment that provides, in part, a stringer of a composite panel in accordance with an example implementation of the present teachings.

FIG. 6 is a table listing reinforcement plies and their fiber orientations in a reinforcement ply stack of a base segment that provides, in part, a stringer of a composite panel in accordance with an example implementation of the present teachings.

FIG. 7 is a table listing reinforcement plies and their fiber orientations in a reinforcement ply stack of a top segment that provides, in part, a stringer of a composite panel in accordance with an example implementation of the present teachings.

FIG. 8 depicts a runout of a stringer that includes a base segment and a top segment in an example implementation of the present teachings.

FIG. 9 is a table listing parameters and characteristics of various subcomponents of a composite panel in accordance with an implementation of the present teachings.

FIG. 10 is a graph depicting an axial modulus of elasticity (i.e., stiffness) of various components of a composite panel in an example implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally and/or where convenient, the same reference numbers will be used throughout the drawings to refer to the same or like parts.

An implementation of the present teachings includes a composite panel and methods for fabricating the composite panel. The composite panel may be a subcomponent of a larger structure such as an aircraft, aerospace vehicle, or another structure. The composite panel may include a plurality of segments, with each segment including a plurality of stacked plies of reinforcement material (i.e., reinforcement plies) that can be or include, for example, carbon fibers. In an implementation, a configuration of the composite panel as designed has an increased resistance to delamination and thermal cracking that may result from thermal mismatch, bending or warping of the composite panel during use, or from other stresses and strains, compared to some conventional composite panels. The composite panel may include a solid laminate stringer and a configuration that facilitates stringer runout.

Figure 1:
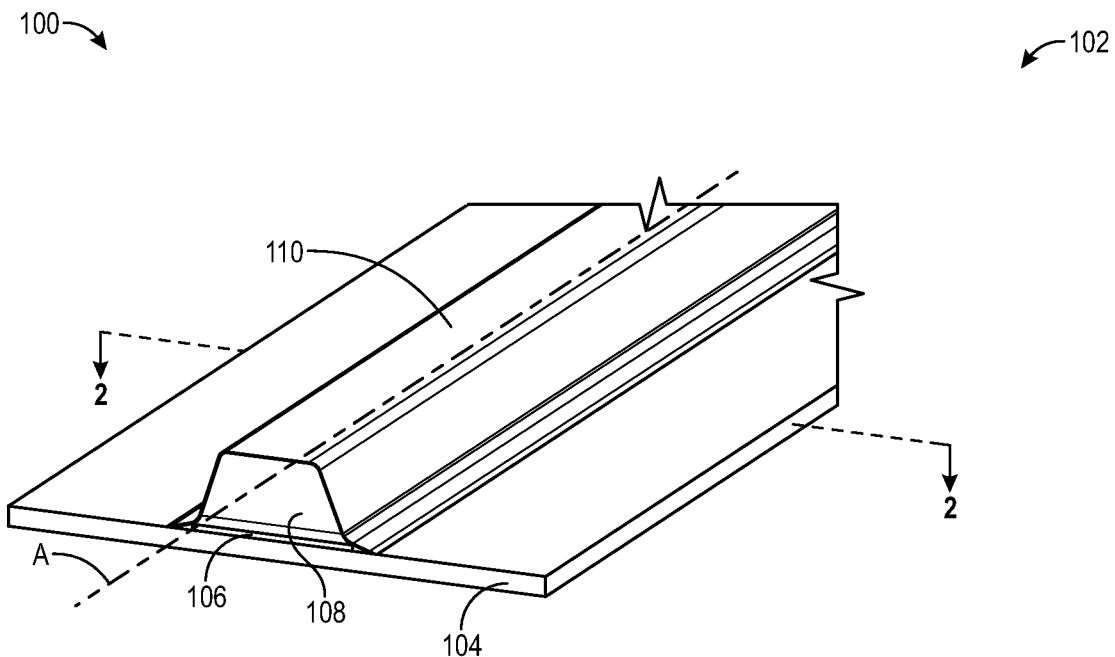
FIG. 1 is a perspective depiction of a composite panel including a skin and a stringer in accordance with an example implementation of the present teachings.
Figure 2:
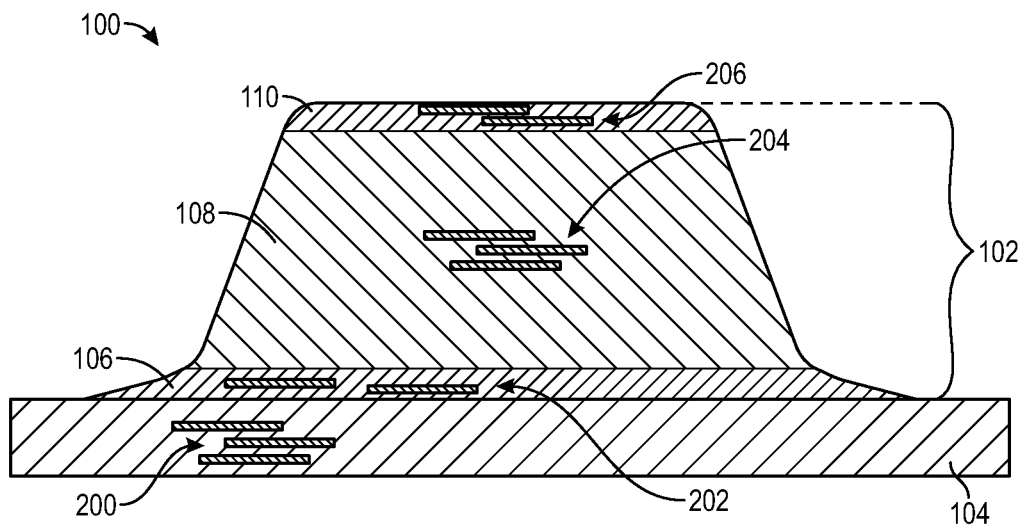
FIG. 2 is a cross section along 2-2 of FIG. 1.

FIG. 1 is a perspective depiction, and FIG. 2 is a cross section along 2-2 of FIG. 1, of a portion of a composite panel 100 in accordance with an implementation of the present teachings. For purposes of description, the composite panel 100 includes a solid laminate stringer (hereinafter, "stringer") 102 and a skin segment (i.e., a skin laminate) 104, but other types of composite panels that do not include a stringer 102 and/or a skin segment 104 are contemplated. Stringers and skins are well known, for example, in the field of aircraft manufacturing and other industries.

The stringer 102 of FIG. 1 includes a base segment 106, a middle segment 108 and a top segment 110. As depicted in FIGS. 1 and 2, the base segment 106 and the middle segment 108 are positioned between the skin segment 104 and the top segment 110, and the middle segment 108 is positioned between the base segment 106 and the top segment 110.

As described in more detail below, each of the skin segment 104, the base segment 106, the middle segment 108, and the top segment 110 includes a plurality of reinforcement plies 200, 202, 204, and 206 respectively. While only a few reinforcement plies 200-206 extending only part way across each segment 104-110 are depicted for simplicity, it will be appreciated that each segment 104-110 includes at least 8 reinforcement plies 200-206 extending across most or all of each segment 104-110. In some structures, each segment 104-110, or one or more of the segments 104-110, can include at least 10, or at least 16, or at least 100, or at least 200, or at least 500, or at least 1000 reinforcement plies 200-206. Each reinforcement ply of the plurality of reinforcement plies can be, for example, a plurality of carbon fiber plies. The plurality of reinforcement plies can be pre-impregnated with an adhesive resin such as a thermoplastic resin that adheres the plurality of reinforcement plies of each segment together, and can be referred to as a prepreg. Each ply of the plurality of reinforcement plies 200-208 extends across a length and a width of each segment 104-110 respectively and is oriented as depicted. Each of the plurality of plies 200-208 are layered (i.e., stacked) along a thickness of each segment 104-110 to form a reinforcement ply stack (e.g., a carbon fiber stack). In the orientation of the FIG. 2 depiction, each reinforcement ply extends horizontally, where each reinforcement ply stack includes a plurality of reinforcement plies that are stacked vertically.

Each of the segments 104-110 can be formed using an automated fiber placement (AFP) process, in which a computer-controlled fiber placement head of a fiber placement system deposits a plurality of prepreg tows that form a collimated fiber band onto a surface. In some processes, the collimated fiber band is deposited onto a mandrel that provides or defines a shape of the final component to be produced. In these processes, the segments 104-110 are chemically bonded and/or mechanically fastened together. In other processes, the skin segment 104 can be deposited and manufactured first, then the base segment 106 can be deposited onto the skin segment 104, the middle segment 108 is deposited onto the base segment 106, and the top segment 110 is deposited onto the middle segment 108. In an alternative, the order can be reversed such that the top segment 110 is deposited first and the skin segment 104 is deposited onto the base segment 106 last.

FIG. 1 depicts a longitudinal axis "A" extending through, and parallel to, a length of the composite panel 100 and a length of the stringer 102. For purposes of this disclosure, the longitudinal axis A through, and parallel to, the length of the composite panel 100 is defined as being at 0° (i.e., in the axial direction) relative to the composite panel 100. During the deposition of each collimated fiber band, the fiber placement head can travel in the 0° direction to deposit the collimated fiber band in the 0° direction such that the collimated fiber band is oriented at 0°. In this orientation, the fiber placement head requires the fewest number of passes across the composite panel to deposit the plurality of collimated fiber bands that form a single reinforcement ply.

Figure 3:
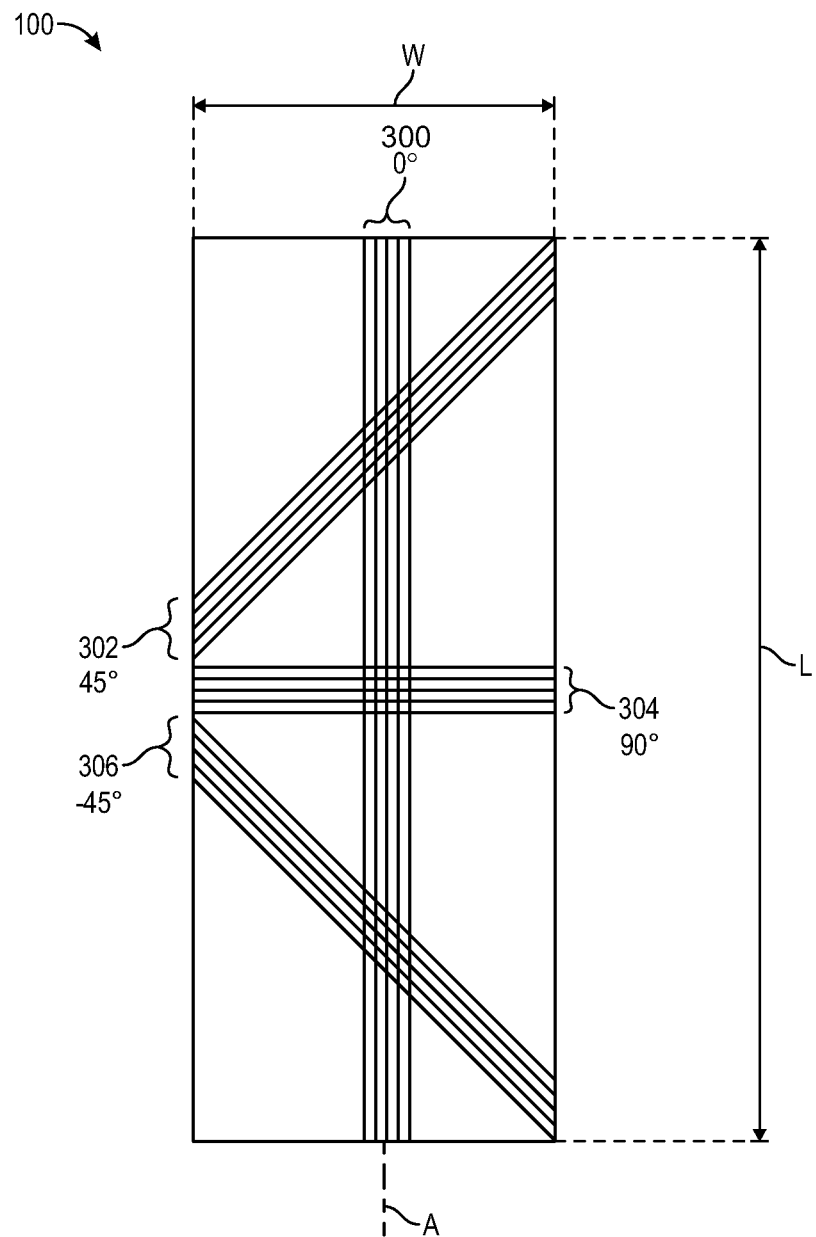
FIG. 3 is a plan view of four collimated fiber bands of four different reinforcement plies according to an implementation of the present teachings.

FIG. 3 is a schematic plan view depicting a composite panel 100, where the length "L" of the composite panel 100, and thus the axis "A," is oriented at 0° from top to bottom and a width "W" is oriented from left to right. During the deposition of each collimated fiber band 300-306, a direction of travel of the fiber placement head can be changed to deposit the collimated fiber bands 300-306 in various different directions. FIG. 3 schematically depicts four collimated fiber bands 300-306 deposited during four separate passes of the fiber placement head in four different directions to form four different plies. The collimated fiber bands 300, 302, 304, and 306 are respectively oriented at 0°, 45°, 90° and −45°. While FIG. 3 depicts a result of only one pass of the fiber placement head for each reinforcement ply for simplicity, it will be appreciated that a sufficient number of passes of the fiber placement head is made to complete each reinforcement ply. Further, the four collimated fiber bands 300-306, and thus their respective reinforcement ply, are stacked vertically (i.e., perpendicular to a plane of the page).

The specific orientations of the collimated fiber bands 300-306 that are stacked to form one of the segments 104-110 will determine a stiffness of the segment 104-110. For example, a segment that includes a plurality of reinforcement plies having collimated fiber bands that are only oriented at 0° will be a relatively stiff segment, while a segment that includes a plurality of reinforcement plies that are only oriented at 90° will be a relatively flexible segment.

The present teachings include a composite panel having a plurality of segments. The stiffness of each segment is controlled during a design and manufacture of the composite panel through the selection of the orientation of the collimated fiber bands within each reinforcement ply of the plurality of reinforcement plies that make up the segment. Further, the orientation of the collimated fiber bands of the reinforcement plies within each segment is designed and selected to improve adhesion between adjacent reinforcement plies, and thereby to improve an overall adhesion of each segment to reduce delamination within each segment, compared to some conventional designs. Additionally, the stiffness of each segment of the plurality of segments that make up the composite panel is designed to improve adhesion between adjacent segments, and thereby to reduce a stiffness mismatch between adjacent segments to reduce separation of the composite panel between adjacent segments.

In an implementation of the present teachings, the orientation of the plurality of reinforcement plies within each individual segment across a thickness of each segment is designed, controlled, and/or selected to be self-symmetric or mostly self-symmetric. For purposes of the present disclosure, unless otherwise stated, in a self-symmetric segment, an entirety of the plurality of reinforcement plies that make up the self-symmetric segment are mirror symmetric about a midpoint of the thickness of the self-symmetric segment. In a mostly self-symmetric segment, no more than two reinforcement plies of the plurality of reinforcement plies that make up the mostly self-symmetric segment are out of order or differ from mirror symmetric about a midpoint of the thickness of the segment. In other words, in a mostly self-symmetric segment, changing the orientations of no more than two reinforcement plies (i.e., either one ply or two plies) would result in the segment being self-symmetric.

Further, as used herein when referring to a plurality of reinforcement plies that form an entire thickness of two or more segments, the term "self-symmetric" indicates that the plurality of reinforcement plies that form the two or more segments are mirror symmetric about a midpoint of the two or more segments, while "mostly self-symmetric" indicates that, in the plurality of reinforcement plies that form the two or more segments, no more than two reinforcement plies of the plurality of reinforcement plies that make up the mostly self-symmetric stack are out of order or differ from mirror symmetric about a midpoint of the thickness of the two or more segments. In other words, across the two or more segments, changing the orientations of no more than two reinforcement plies (i.e., either one ply or two plies) would result in the plurality of reinforcement plies that form the two or more segments being self-symmetric. It will be appreciated that the two or more segments that are self-symmetric or mostly self-symmetric can positioned adjacent to each other or can have other structures such as other segments positioned between them.

Moreover, the "midpoint" of the segment (or the two or more segments) is the midpoint relative to the number of reinforcement plies that make up the reinforcement ply stack. In a segment (or two or more segments) including an odd number of reinforcement plies, the midpoint would be the middle reinforcement ply; in a segment (or two or more segments) including an even number of reinforcement plies, the midpoint would be between the two reinforcement plies at the middle of the segment (or at the middle of the two or more segments), with an equal number of reinforcement plies on opposite sides of the midpoint. Also, "corresponding" reinforcement plies refers to two reinforcement plies that are equidistant from, but on opposite sides of, a common midpoint.

As described above, in an implementation of the present teachings, all of the reinforcement plies that make up two or more segments of the composite panel can be self-symmetric or mostly self-symmetric across the thickness of the composite panel that includes the two or more segments. With regard to the example of FIGS. 1 and 2, the three segments 106-110 that make up the stringer 102 can be self-symmetric or mostly self-symmetric. Further, the stiffness of the stringer 102 (i.e., the segments 106-110 that make up the stringer 102) can be matched to the stiffness of the skin segment 104. By matching the stiffness of these two structures (i.e., the skin segment 104 and the stringer 102), the stiffness mismatch that can result in separation of the stringer from the skin can be reduced or eliminated.

FIGS. 4-7 are tables listing example reinforcement ply orientations for the four segments 104-110 of FIG. 1, where FIG. 4 depicts example reinforcement ply orientations for the skin segment 104, FIG. 5 depicts example reinforcement ply orientations the middle segment 108, FIG. 6 depicts example reinforcement ply orientations for the base segment 106, and FIG. 7 depicts example reinforcement ply orientations for the top segment 110. As depicted in FIGS. 4-7, the skin segment 104 includes 40 reinforcement plies, the middle segment 108 includes 32 reinforcement plies, and each of the base segment 106 and the top segment 110 includes 14 plies. It will be appreciated that each of the segments 104-110 can include more or fewer than the plies depicted. For example, in an implementation, each of the segments 104-110 can include at least 8 plies, and may include more than 1000 plies. In each of these implementations, the reinforcement plies within each segment will be self-symmetric or mostly self-symmetric. Further, the reinforcement plies across all segments that make up the composite panel will be self-symmetric or mostly self-symmetric.

FIG. 4 is a table listing reinforcement plies and their fiber orientations in a self-symmetric skin segment 104 having 40 reinforcement plies 200 (depicted in FIG. 2). As depicted in FIG. 4, the bottommost ply (ply #1) is oriented in the same direction (45°) as the topmost ply (ply #40), ply #2 is oriented in the same direction (90°) as ply #39, etc., until the midpoint 400 between reinforcement plies #20 and #21, where reinforcement plies #20 and #21 are both oriented at 0°. Further, the skin segment 104 can include reinforcement plies 200 that are made up from about 25% to about 40% collimated fiber bands oriented in the 0° direction. Using these parameters, the skin segment 104 will have an axial modulus of elasticity from about 7.7 megapounds per square inch (msi) to about 10.0 msi, and a Poisson's ratio is from about 0.32 to about 0.48.

FIG. 5 is a table listing reinforcement plies and their fiber orientations in a self-symmetric middle segment 108 having 32 reinforcement plies 204 (depicted in FIG. 2). As depicted in FIG. 5, the bottommost ply (ply #1) is oriented in the same direction (0°) as the topmost ply (ply #32), ply #2 is oriented in the same direction (0°) as ply #32, etc., until the midpoint 500 between reinforcement plies #16 and #17, where reinforcement plies #20 and #21 are both oriented at 0°. The ply stacking depicted in FIG. 5 provide a repeatable group of reinforcement plies that can be duplicated or repeated by any even number of times (i.e., by 2 times, 4 times, 6 times, etc.) to form a thicker middle segment 108. This allows the overall solid laminate (e.g., stringer 102) adjacent to the skin segment 104 to have thickness that can be selected or designed based on the loads, deformation, and damage protection anticipated during use. Further, the middle segment 108 can include reinforcement plies 204 that are made up from about 46% to about 58% collimated fiber bands oriented in the 0° direction. Using these parameters, the middle segment will have an axial modulus of elasticity from about 11.4 msi to about 13.4 msi, and a Poisson's ratio from about 0.38 to about 0.50

FIG. 6 is a table listing reinforcement plies and their fiber orientations in a mostly self-symmetric base segment 106 having 14 reinforcement plies 202 (depicted in FIG. 2). As depicted in FIG. 6, the bottommost ply (ply #1) is oriented in the same direction (45°) as the topmost ply (ply #14), ply #2 is oriented in the same direction (90°) as ply #13, etc., until corresponding reinforcement plies 6 (oriented at 45°) and 9 (oriented at −45°), which are not symmetrical. The remaining reinforcement plies 7 and 8 are symmetrical about the midpoint 600 therebetween. Thus the base segment 106 (depicted in FIG. 2) is mostly self-symmetric, because changing one ply (i.e., either changing ply 6 to −45° or ply 9 to 45°) would render the base segment 106 self-symmetric. Further, the base segment 106 can include reinforcement plies 202 that are made up from about 40% to about 46% collimated fiber bands oriented in the 0° direction. Using these parameters, the base segment 106 will have an axial modulus of elasticity from about 10.0 msi to about 11.4 msi, and a Poisson's ratio from about 0.36 to about 0.50.

FIG. 7 is a table listing reinforcement plies and their fiber orientations in a mostly self-symmetric top segment 110 having 14 reinforcement plies 206 (depicted in FIG. 2). As depicted in FIG. 7, the bottommost ply (ply #N-13) is oriented in the same direction (45°) as the topmost ply (ply #N), ply #N-1 is oriented in the same direction (90°) as ply #N-12, etc., until corresponding reinforcement plies N-8 (oriented at −45°) and N-5 (oriented at 45°), which are not symmetrical. The remaining reinforcement plies N-7 and N-6 are symmetrical about the midpoint 700 therebetween. Thus the top segment 110 (FIG. 2) is mostly self-symmetric, because changing one ply (i.e., either changing ply N-8 to 45° or ply N-5 to −45°) would render the top segment 110 symmetrical. Further, the top segment 110 can include reinforcement plies 206 that are made up from about 40% to about 46% collimated fiber bands oriented in the 0° direction. Using these parameters, the top segment 110 will have an axial modulus of elasticity from about 10.0 msi to about 11.4 msi, and a Poisson's ratio from about 0.36 to about 0.50.

Further, the segments 104-110 will include reinforcement plies that are made up from about 12% or more of collimated fiber bands that are oriented a transverse angle (i.e., 90°).

Forming the skin segment 104, the base segment 106, the middle segment 108, and the top segment 110 with the collimated fiber band percentages listed above will result in the segments having the axial moduli of elasticity and Poisson's ratios as described. Forming the segments to have the specific ranges of axial moduli of elasticity and Poisson's ratios as described above will result in one integrated structure that has a high resistance to delamination, a reduced global waviness, a reduced weight, and decreased fabrication and material costs compared to conventional structures formed using conventional methods. Forming the segments 104-110 to have lower axial moduli of elasticity than described above will result in a structure having an increased weight, fabrication time, and cost. Forming the segments 104-110 to have higher axial moduli of elasticity than described above will result in a structure having an increased propensity for delamination due to an increase in mismatch stress between the skin segment 104 and the stringer 102. Forming the segments 104-110 to have Poisson's ratios lower than those described above will form a structure that has a decreased resistance to delamination resulting from a mismatch in the Poisson's ratio between the structures. Forming segments 104-110 to have Poisson's ratios higher than those described above will result in an increase in Poisson's ratio mismatch, a decrease in resistance to delamination, and an increase in global waviness.

Additionally, as depicted in FIGS. 6 and 7, the base segment 106 and the top segment 110 are self-symmetric (i.e., mirror symmetric) relative to each other about the midpoint 650 between them. Thus in solid laminate termination areas or runouts, such as the runout 800 depicted in FIG. 8 (e.g., an end of a stringer 102), the base segment 106 and the top segment 110 join to form a self-symmetric runout 800. For example, during formation of the stringer 102, the plurality of plies 204 that form the middle segment 108 can be formed of different lengths such that the middle segment 108 becomes increasingly thin until, at an end of the stringer 102, the runout 800 includes only the base segment 106 and the top segment 110. In other words, the plies that make up the self-symmetric reinforcement ply stack of the middle segment 108 are sequentially dropped in pairs of corresponding reinforcement plies (e.g., plies 1 and 32, then plies 2 and 31, etc.) until only the base segment 106 and the top segment 110 remain to form the runout 800. As depicted in FIG. 8, the base segment 106 and the top segment 110 have the same thickness. Further, as discussed above, the base segment 106 is mirror symmetric to the top segment 110 relative to a midpoint 802 at an interface between the two segments 106, 110. It will be appreciated that midpoint 802 is analogous to midpoint 650 of FIG. 6.

Further, because the middle segment 108 is self-symmetric about the midpoint 500, the stringer 102 that is formed from the base segment 106, the middle segment 108, and the top segment 110, where the middle segment 108 is positioned between the base segment 106 and the top segment 110, is also self-symmetric.

FIG. 9 is a table showing an axial fiber percent (i.e., the percent of collimated fiber bands oriented at (0°), the transverse fiber percent (i.e., the percent of collimated fiber bands oriented at (90°), the axial modulus of elasticity, the Poisson's ratio, and the Poisson's ratio mismatch relative to the skin for each of the segments 104-110 in the example implementation described herein. A Poisson's ratio mismatch between the skin segment 104 and the base segment 106 is in the range of from about −0.06 to about 0.06. Further, a Poisson's ratio mismatch between the base segment 106 and the middle segment, and between the top segment 110 and the middle segment 108, is also in the range of from about −0.06 to about 0.06. These relatively low Poisson's ratio mismatches reduce or prevent the stringer 102 from delaminating from the skin segment 104, and also reduce or prevent the base segment 106 and the top segment 110 from delaminating from the middle segment 108.

In the composite panel 100 of FIG. 1, an overall stiffness of the composite panel varies gradually from relatively soft skin segment 104, to a relatively stiffer base segment 106 and top segment 110, to a much stiffer middle segment 108, where the base segment 106 and the top segment 110 are stiffer than the skin segment 104 but less stiff than the middle segment 108. The stiffness of each segment 104-110 in an example implementation is depicted in FIG. 10, which shows a gradual change in the axial modulus of elasticity from segment to segment. This gradual change reduces the stiffness mismatch between adjacent segments, which improves resistance to delamination, thereby reducing or eliminating separation and delamination between segments.

Overall combinations and sequences of the proposed reinforcement ply stacking from skin segment 104 to the segments 106-110 that form the stringer 102 can reduce a global waviness of the stiffened composite panel 100 and can improve build quality of the composite panel. In an implementation, a global waviness of the composite panel 100 can be reduced by 30% or more, or by 40% or more, compared to composite panels manufactured using conventional techniques. This reduced global waviness of the composite panel can result in less assembly work/re-work. Further, the reduced global waviness can reduce recurring costs and improve workforce safety, for example, by reducing labor injuries caused by working in confined workspaces during assembly. With reduced global waviness, the requirement to fill reduced gaps between parts or structures resulting from global waviness is mitigated or eliminated.

As discussed above, the collimated fiber bands 300-306 of FIG. 3 are deposited using a fiber placement head of a fiber placement system. The fiber placement head makes multiple passes across the mandrel to deposit each reinforcement ply. When a first ply is completed, the fiber placement head may deposit a second ply over the first ply. A reinforcement ply having a 0° orientation requires the least time to deposit because the 0° orientation requires the fewest number of passes of the fiber placement head across the mandrel to complete a reinforcement ply. Conversely, a reinforcement ply having a 90° orientation requires the most time to deposit because the 90° orientation requires the highest number of passes of the fiber placement head across the mandrel to complete a reinforcement ply.

In an implementation of the present teachings, common multi-ply components or groups of reinforcement plies can be pre-assembled (i.e., pre-manufactured) and stored for later use. The various required multi-ply components can then be removed from storage and assembled into the final component.

Figure 11:
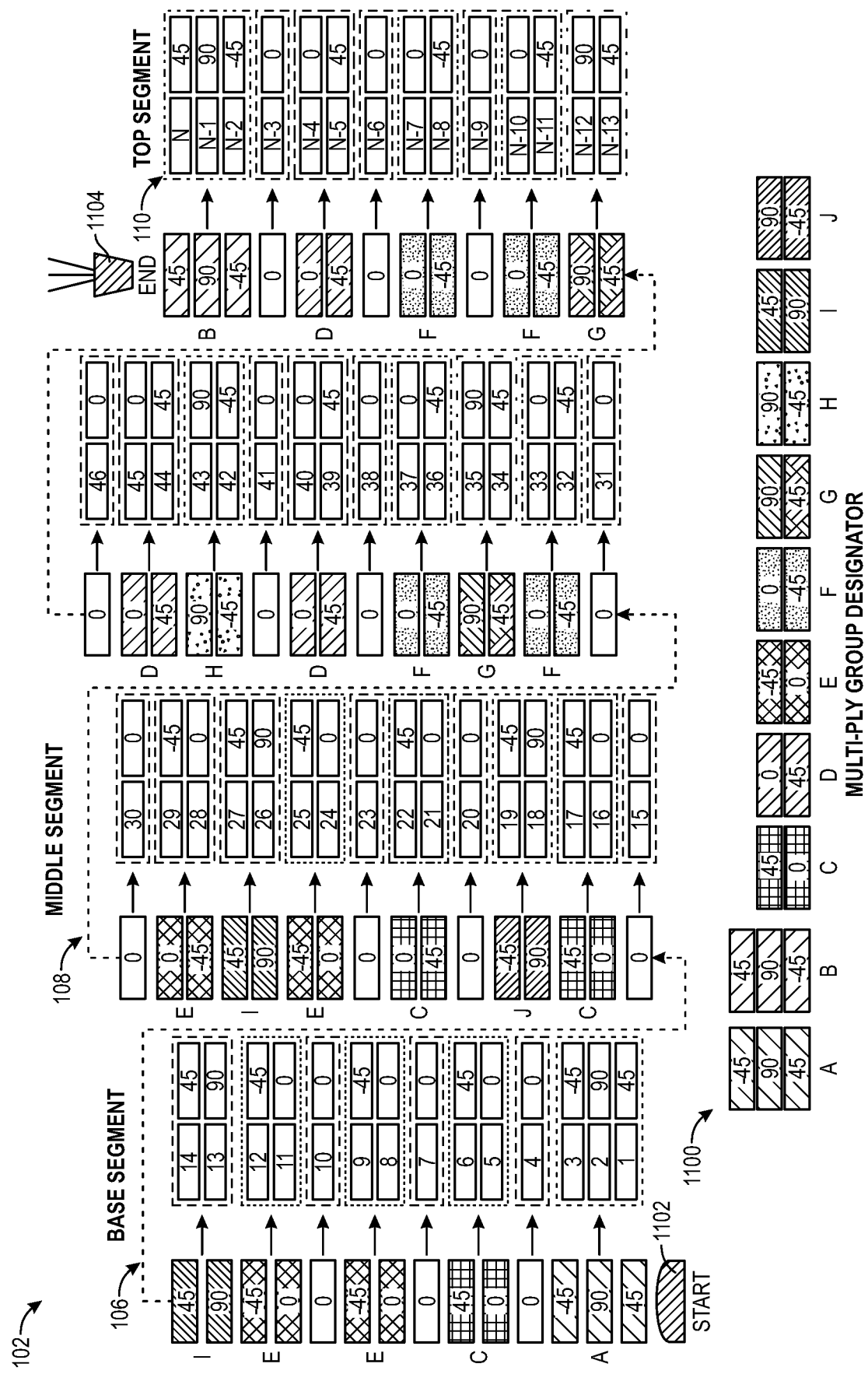
FIG. 11 is a schematic depiction of the formation of a stringer of a composite panel in an example implementation of the present teachings.

For example, FIG. 11 depicts a plurality of multi-ply groups 1100, where each multi-ply group is designated by a letter A-J (i.e., 10 different multi-ply groups). FIG. 11 further depicts a stringer 102 that includes a base segment 106, a middle segment 108, and a top segment 110. A plurality of each multi-ply group A-J can be pre-assembled and stored until a composite panel 100 including the stringer 102 is to be manufactured. Prior to a build of the composite panel 100, the required number of each multi-ply groups A-J is requested and delivered to the build location. The build begins by placing the first required multi-ply group of the stringer 102 which, in this example implementation, is the three ply group A of the base segment 106, onto a mandrel 1102. The next required reinforcement ply is oriented at 0° which can be deposited relatively rapidly as described above. As such, the reinforcement plies oriented at 0° are deposited using the fiber placement head 1104 of the fiber placement system. Next, each required multi-ply group A-J is placed and each required reinforcement ply oriented at 0° is deposited to form each of the base segment 106, middle segment 108, and top segment 110 as depicted in FIG. 11. In the example implementation of FIG. 11, after the last multi-ply group B is placed, this part of the composite panel 100 formation is complete. Additional processing as required by the specific process, such as a debulk and resin cure of the prepreg, can be completed subsequently.

Manufacturing the multi-ply groups in advance decreases the production time required at the mandrel, and thus increases production throughput. The deposition of 0° collimated fiber bands requires the least number of passes of the fiber placement head 1104 over the mandrel 1102, and thus the least amount of time compared to forming collimated fiber bands with a 45°, 90°, and −45° orientation. However, forming one or more multi-ply groups including one or more 0° reinforcement plies is contemplated and depicted, for example, in multi-ply groups C-F. Further, while FIG. 11 depicts 10 multi-ply groups A-J each having either two or three reinforcement plies, it will be appreciated that any number of multi-ply groups having any number of reinforcement plies in each group is contemplated.

Thus in a method for forming a composite panel, a plurality of reinforcement plies (e.g., carbon fiber plies including collimated fiber bands including carbon fibers) can be layered together to form a carbon fiber stack of a composite panel segment. The carbon fiber stack can include, for example, at least 8 carbon fiber plies, or at least 10 carbon fiber plies, or at least 16 carbon fiber plies, or at least 100 carbon fiber plies, or at least 200 carbon fiber plies, or at least 1000 carbon fiber plies. The plurality of carbon fiber plies are adhered together, for example, using a process that includes debulking of the carbon fiber plies and curing of a resin with which the carbon fiber plies are pre-impregnated. The plurality of carbon fiber plies are arranged along a length and a width of the composite panel segment, and form at least a portion of a thickness of the composite panel segment. The length of the composite panel segment includes a longitudinal axis, and each carbon fiber ply of the carbon panel stack includes a stiffness determined by an orientation of carbon fibers within each carbon fiber ply relative to the longitudinal axis. The plurality of carbon fiber plies of the carbon fiber stack includes a plurality of different orientations relative to the longitudinal axis, and thus the plurality of carbon fiber plies of the carbon fiber stack include a plurality of different stiffnesses. The different orientations of the plurality of carbon fiber plies of the carbon fiber stack are self-symmetric or mostly self-symmetric through the thickness of the composite panel segment about a midpoint of the carbon fiber stack, where the midpoint is parallel to the longitudinal axis. When mostly self-symmetric, the different orientations vary from being self-symmetric in no more than two carbon fiber plies.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A composite panel, comprising:
a solid laminate stringer structure comprising a composite panel segment comprising a base segment, a top segment, and a middle segment, the middle segment comprising a plurality of carbon fiber plies arranged along a length and a width of the composite panel segment, wherein the length of the composite panel segment comprises a longitudinal axis;
the plurality of carbon fiber plies are layered into a carbon fiber stack that provides at least a portion of a thickness of the composite panel segment;
the carbon fiber stack comprises at least 8 carbon fiber plies;
each carbon fiber ply of the carbon fiber stack comprises a stiffness, wherein the stiffness of each carbon fiber ply is determined by an orientation of carbon fibers within each carbon fiber ply relative to the longitudinal axis;
the plurality of carbon fiber plies of the carbon fiber stack comprises a plurality of different orientations relative to the longitudinal axis, and thus the plurality of carbon fiber plies of the carbon fiber stack comprises a plurality of different stiffnesses;
the different orientations of the plurality of carbon fiber plies of the carbon fiber stack are mostly self-symmetric through the thickness of the composite panel segment about a midpoint of the carbon fiber stack, where the midpoint is parallel to the longitudinal axis and wherein, the different orientations vary from being self-symmetric in no more than two carbon fiber plies; and
wherein the middle segment is positioned between the base segment and the top segment.

2. The composite panel of claim 1, wherein:
the longitudinal axis of the of the composite panel segment is oriented at 0°; and the different orientations of the plurality of carbon fiber plies include 0°, 45°, 90°, and −45° relative to the longitudinal axis of the composite panel segment.

3. The composite panel of claim 2, wherein:
the composite panel segment is a middle segment positioned between a base segment and a top segment;
the middle segment has an axial modulus of elasticity of from about 11.4 megapounds per square inch (msi) to about 13.4 msi and a Poisson's ratio of from about 0.38 to about 0.50; and
from 46% to 58% of the plurality of carbon fiber plies are oriented at 0°.

4. The composite panel of claim 1, wherein the plurality of carbon fiber plies of the carbon fiber stack comprise a plurality of repeatably grouped carbon fiber plies, wherein each repeatable group of carbon fiber plies is repeated 2, 4, or 6 times.

5. The composite panel of claim 1, wherein the carbon fiber stack is a middle segment carbon fiber stack, and the composite panel further comprises:
a plurality of carbon fiber plies arranged along a length and a width of the base segment and the length of the base segment is parallel to the longitudinal axis;
the plurality of carbon fiber plies of the base segment are layered into a base segment carbon fiber stack that provides at least a portion of a thickness of the base segment;
the base segment carbon fiber stack comprises at least 10 carbon fiber plies;
the plurality of carbon fiber plies of the base segment carbon fiber stack comprises a plurality of different orientations relative to the longitudinal axis, and thus the plurality of carbon fiber plies of the base segment carbon fiber stack comprises a plurality of different stiffnesses; and
the different orientations of the plurality of carbon fiber plies of the base segment carbon fiber stack are self-symmetric or mostly self-symmetric through the thickness of the base segment about a midpoint of the base segment carbon fiber stack, where the midpoint of the base segment is parallel to the longitudinal axis wherein, when mostly self-symmetric, the different orientations of the plurality of carbon fiber plies of the base segment carbon fiber stack vary from being self-symmetric in no more than two carbon fiber plies.

6. The composite panel of claim 5, wherein:
the longitudinal axis of the of the composite panel segment is oriented at 0°; and
the different orientations of the plurality of carbon fiber plies of the middle segment carbon fiber stack and the plurality of carbon fiber plies of the base segment carbon fiber stack include 0°, 45°, 90°, and −45° relative to the longitudinal axis of the composite panel segment.

7. The composite panel of claim 6, wherein:
the middle segment has an axial modulus of elasticity from about 11.4 megapounds per square inch (msi) to about 13.4 msi; and
the base segment and the top segment each have an axial modulus of elasticity from about 10.0 msi to about 11.4 msi.

8. The composite panel of claim 6, wherein:
the middle segment has a Poisson's ratio from about 0.38 to about 0.50; and
the base segment and the top segment each have a Poisson's ratio from about 0.36 to about 0.50.

9. The composite panel of claim 5, wherein the top segment comprises:
a plurality of carbon fiber plies arranged along a length and a width of the top segment and the length of the top segment is parallel to the longitudinal axis;
the plurality of carbon fiber plies of the top segment are layered into a top segment carbon fiber stack that provides at least a portion of a thickness of the top segment;
the top segment carbon fiber stack comprises at least 10 carbon fiber plies;
the plurality of carbon fiber plies of the top segment carbon fiber stack comprises a plurality of different orientations relative to the longitudinal axis, and thus the plurality of carbon fiber plies of the top segment carbon fiber stack comprises a plurality of different stiffnesses;
the different orientations of the plurality of carbon fiber plies of the top segment carbon fiber stack are self-symmetric or mostly self-symmetric through the thickness of the top segment about a midpoint of the top segment carbon fiber stack, where the midpoint of the top segment carbon fiber stack is parallel to the longitudinal axis wherein, when mostly self-symmetric, the different orientations of the plurality of carbon fiber plies of the top segment carbon fiber stack vary from being self-symmetric in no more than two carbon fiber plies; and
the plurality of carbon fiber plies of the top segment carbon fiber stack is mirror symmetrical to the plurality of carbon fiber plies of the base segment carbon fiber stack.

10. The composite panel of claim 9, wherein
the top segment carbon fiber stack, the middle segment carbon fiber stack, and the base segment carbon fiber stack form at least a portion of the solid laminate stringer structure of the composite panel.

11. The composite panel of claim 9, further comprising:
a skin segment, wherein the top segment, the middle segment, and the base segment are positioned on a side of the skin segment and the base segment is positioned between the middle segment and the skin segment;
the skin segment comprises:
a plurality of carbon fiber plies arranged along a length and a width of the skin segment, wherein the length of the skin segment is parallel to the longitudinal axis;
the plurality of carbon fiber plies of the skin segment are layered into a skin segment carbon fiber stack that provides at least a portion of a thickness of the skin segment;
the skin segment carbon fiber stack comprises at least 8 carbon fiber plies;
the plurality of carbon fiber plies of the skin segment carbon fiber stack comprises a plurality of different orientations relative to the longitudinal axis, and thus the plurality of carbon fiber plies of the skin segment carbon fiber stack comprises a plurality of different stiffnesses; and
the different orientations of the plurality of carbon fiber plies of the skin segment carbon fiber stack are self-symmetric through the thickness of the skin segment about a midpoint of the skin segment carbon fiber stack, where the midpoint of the skin segment carbon fiber stack is parallel to the longitudinal axis.

12. The composite panel of claim 11, wherein:
the longitudinal axis of the composite panel segment is oriented at 0°;
the different orientations of the plurality of carbon fiber plies of the middle segment carbon fiber stack, the plurality of carbon fiber plies of the base segment carbon fiber stack, and the plurality of carbon fiber plies of the skin segment carbon fiber stack include 0°, 45°, 90°, and −45° relative to the longitudinal axis of the composite panel segment;
from about 46% to about 58% of the plurality of carbon fiber plies of the middle segment carbon fiber stack are oriented at 0°; and
from about 40% to about 46% of the plurality of carbon fiber plies of each of the top segment carbon fiber stack and the base segment carbon fiber stack are oriented at 0°.

13. The composite panel of claim 12, wherein:
the middle segment has an axial modulus of elasticity from about 11.4 megapounds per square inch (msi) to about 13.4 msi and a Poisson's ratio of from about 0.38 to about 0.50;
the base segment and the top segment each have an axial modulus of elasticity from about 10.0 msi to about 11.4 msi;
the base segment and the top segment each have a Poisson's ratio of from about 0.36 to about 0.50; and
the skin segment has an axial modulus of elasticity from about 7.7 msi to about 10.0 msi.

14. The composite panel of claim 13, wherein:
the top segment, the middle segment, and the base segment form at least a portion of a solid laminate; and
a mismatch of a Poisson's ratio between the solid laminate and the skin segment is in a range of from about −0.06 to about 0.06.

15. A composite panel, comprising:
a solid laminate stringer structure comprising a middle segment, a base segment, and a top segment, each composite panel segment comprising a plurality of reinforcement plies arranged along a length and a width of the composite panel segment, wherein the length of the composite panel segment comprises a longitudinal axis;
the plurality of reinforcement plies are layered into a reinforcement ply stack that provides at least a portion of a thickness of the composite panel segment;
the plurality of reinforcement plies of the reinforcement ply stack comprises a plurality of different orientations relative to the longitudinal axis;
the different orientations of the plurality of reinforcement plies of the reinforcement ply stack are mostly self-symmetric through the thickness of the composite panel segment about a midpoint of the reinforcement ply stack, where the midpoint is parallel to the longitudinal axis wherein the different orientations vary from being self-symmetric in no more than two carbon fiber plies; and
wherein the middle segment is positioned between the base segment and the top segment.

16. The composite panel of claim 15, wherein:
the plurality of reinforcement plies comprises at least 16 reinforcement plies.

17. A method for forming a composite panel of a solid laminate stringer structure, comprising:
layering a plurality of carbon fiber plies together to form a carbon fiber stack of a base composite panel segment, a middle composite panel segment, or a top composite panel segment of the solid laminate stringer structure, wherein the carbon fiber stack comprises at least 10 carbon fiber plies; and
adhering the plurality of carbon fiber plies together, wherein:
the plurality of carbon fiber plies are arranged along a length and a width of the composite panel segment;
the plurality of carbon fiber plies form at least a portion of a thickness of the composite panel segment;
the length of the composite panel segment comprises a longitudinal axis;
each carbon fiber ply of the carbon panel stack comprises a stiffness;
the stiffness of each carbon fiber ply is determined by an orientation of carbon fibers within each carbon fiber ply relative to the longitudinal axis;
the plurality of carbon fiber plies of the carbon fiber stack comprises a plurality of different orientations relative to the longitudinal axis, and thus the plurality of carbon fiber plies of the carbon fiber stack comprises a plurality of different stiffnesses;
the different orientations of the plurality of carbon fiber plies of the carbon fiber stack are mostly self-symmetric through the thickness of the composite panel segment about a midpoint of the carbon fiber stack;
the midpoint is parallel to the longitudinal axis; and
the different orientations vary from being self-symmetric in no more than two carbon fiber plies.

18. The method of claim 17, further comprising:
orienting the longitudinal axis of the composite panel segment at 0°; and
orienting each carbon fiber ply of the plurality of carbon fiber plies to have an orientation at one of 0°, 45°, 90°, and −45° relative to the longitudinal axis.

19. The composite panel of claim 15, wherein:
the longitudinal axis of the of the composite panel segment is oriented at 0°; and
the different orientations of the plurality of carbon fiber plies include 0°, 45°, 90°, and −45° relative to the longitudinal axis of the composite panel segment.

20. The composite panel of claim 19, wherein:
the composite panel segment is a middle segment positioned between a base segment and a top segment;
the middle segment has an axial modulus of elasticity of from about 11.4 megapounds per square inch (msi) to about 13.4 msi and a Poisson's ratio of from about 0.38 to about 0.50; and
from 46% to 58% of the plurality of carbon fiber plies are oriented at 0°.

* * * * *